United States Patent Office 3,072,730
Patented Jan. 8, 1963

3,072,730
PROCESS FOR PREPARING PERFLUORO-
ETHYL IODIDE
Robert R. Twelves, Wilmington, Del., assignor to E. I.
du Pont de Nemours and Company, Wilmington, Del.,
a corporation of Delaware
No Drawing. Filed May 12, 1961, Ser. No. 109,527
5 Claims. (Cl. 260—653.7)

This invention relates to a process for preparing perfluoroethyl iodide, particularly to a process for preparing it in a more economical manner from readily available starting materials in a single step.

Perfluoroethyl iodide is known to be a useful intermediate for a variety of synthetic reactions. For example, Haszeldine (Nature, 167, 139 (1951); J. Chem Soc., 3761 (1953)), has shown that $C_2F_5I$ will react with tetrafluoroethylene under the influence of ultraviolet light to form the series of products $C_2F_5(CF_2CF_2)_nI$ wherein $n$ is 1, 2, 3, 4, 5, 6 and 7. These longer chain perfluoroalkyl iodides are known to be valuable intermediates for preparing surface active agents, oil and water repellents, and the like. For example Tiers, in U.S. Patent 2,951,051, discloses that such longer chain perfluoroalkyl iodides can be reacted with unsaturated aliphatic acids to form fluorine-containing aliphatic acids which are useful for a wide variety of purposes.

In the past, the preparation of perfluoroethyl iodide involved heating silver perfluoropropionate with iodine, i.e.

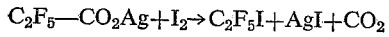

$$C_2F_5—CO_2Ag + I_2 \rightarrow C_2F_5I + AgI + CO_2$$

(Haszeldine et al., J. Chem. Soc., 4259 (1952)) or by heating the corresponding acid chloride with potassium iodide, i.e.

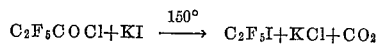

$$C_2F_5COCl + KI \xrightarrow{150°} C_2F_5I + KCl + CO_2$$

(Krespan, J. Org. Chem.; 23, 2016 (1958)). Both processes obviously require the prior preparation of perfluoropropionic acid and the conversion of such acid to either the acid chloride or the silver salt. This leads, in both cases, to rather expensive processes.

Also, W. C. Smith in U.S. Patent 2,937,171 describes a process for replacing organically bonded chlorine or bromine with fluorine by treatment with sulfur tetrafluoride with or without a catalyst, which catalyst may be hydrogen fluoride. Smith does not mention compounds containing iodine, and it has been found that his process, employing his amounts of hydrogen fluoride, is ineffective to produce perfluoroethyl iodide from 1,2-diiodotetrafluoroethane.

It is an object of this invention to provide a new and improved process for preparing perfluoroethyl iodide. Another object is to provide a single-step process for preparing perfluoroethyl iodide from readily available starting materials in a more economical manner. A particular object is to provide a process for preparing perfluoroethyl iodide from 1,2-diiodotetrafluoroethane, preformed or formed in situ. Still other objects are to advance the art.

The above and other objects may be accomplished in accordance with this invention which comprises heating under substantially anhydrous conditions a mixture of one mole of a member of the group consisting of 1,2-diiodotetrafluoroethane and tetrafluoroethylene mixed with from about 0.5 to about 1 mole of iodine, at least about 0.5 mole of sulfur tetrafluoride, and at least about 4 moles of hydrogen fluoride at a temperature of from about 175° C. to about 225° C. under a pressure of between 300 p.s.i.g. and 1500 p.s.i.g., and recovering perfluoroethyl iodide from the reaction mixture.

The process of the present invention involves essentially the reaction of 1,2-diiodotetrafluoroethane with sulfur tetrafluoride in the presence of large amounts of hydrogen fluoride to form perfluoroethyl iodide, iodine, sulfur, and possibly other products which have not been identified. The 1,2-diiodotetrafluoroethane may be preformed, as by reacting tetrafluoroethylene with iodine in the manner disclosed by Raasch in U.S. Patent 2,424,667, and used as such in the process. Alternatively, 1,2-diiodotetrafluoroethane may be formed in situ by treating tetrafluoroethylene mixed with from about 0.5 to about 1 mole of iodine with the sulfur tetrafluoride and the hydrogen fluoride under the conditions required to convert the 1,2-diiodotetrafluoroethane to perfluoroethyl iodide. The formation of the 1,2-diiodotetrafluoroethane in situ requires only about one-half as much iodine as is theoretically required. Apparently, the diiodide that is first formed reacts to form the perfluoroethyl iodide and free iodine which then reacts with further amounts of the tetrafluoroethylene to form further amounts of diiodide for conversion to the perfluoroethyl iodide. For best results, about 0.5 mole of iodine per mole of tetrafluoroethylene should be present initially.

The primary starting materials of the present invention are either liquids or gases, and all are readily available. Tetrafluoroethylene is a readily available commodity which boils at −76.3° C., 1,2-diiodotetrafluoroethane boils at 113° C., sulfur tetrafluoride boils at −35° C., hydrogen fluoride boils at 20° C., the product perfluoroethyl iodide boils at 13° C., and iodine is a solid.

The process, except for recovery steps, is a single-step process and produces the perfluoroethyl iodide economically in high yields. It is carried out in conventional equipment well known to those skilled in the art to be suitable for handling the very corrosive and toxic sulfur tetrafluoride and hydrogen fluoride, and to be capable of withstanding the temperatures and pressures involved. Also, the process is easily carried out and controlled.

The reaction does not involve complete exchange of fluorine between sulfur tetrafluoride and the diiodide, and at least 0.5 mole of sulfur tetrafluoride is necessary to cause substantially complete reaction with the diiodide and to obtain satisfactory results. There appears to be no upper limit on the amount of sulfur tetrafluoride which may be present, but economical factors will dictate employing as little as necessary and generally not more than about 2 moles per mole of 1,2-diiodotetrafluoroethane.

The role of the hydrogen fluoride in the process is not entirely understood. At least 4 moles of hydrogen fluoride for each mole of 1,2-diiodotetrafluoroethane or tetrafluoroethylene are required to produce satisfactory results. The reaction does not take place in the absence of hydrogen fluoride, and materially less than the 4 moles greatly reduce the yields of perfluoroethyl iodide and render the process economically impractical. Such large amounts of hydrogen fluoride are far in excess of what may be considered to be catalytic quantities. There appears to be no upper limit on the amount of hydrogen fluoride which may be present, other than economical factors. Usually, there will be employed from about 4 to about 20 moles of hydrogen fluoride per mole of 1,2-diiodotetrafluoroethane or of tetrafluoroethylene.

The process will be carried out a temperature of from about 175° C. to about 225° C. At significantly lower temperatures, the reaction becomes too slow to be economically feasible. Temperatures significantly above 225° C. will generally result in severe decomposition. The reaction generally requires from about 4 to about 12 hours to go to completion, and it will usually be desirable to use about 10 to 12 hours to insure maximum yields. Heating for longer periods of time does not appear to be harmful, but would be uneconomical. The most preferred conditions are one mole of 1,2-diiodotetrafluoroethane, about 8.8 moles of hydrogen fluoride, about 0.75 mole of sulfur tetrafluoride, a temperature of about 200° C., autogeneous pressure, and a reaction time of about 10 to 12 hours.

The process will be carried out under a pressure of between 300 lbs./sq. in. gauge (p.s.i.g.) and 1500 lbs./sq. in. gauge (p.s.i.g.), and usually at from about 400 p.s.i.g. to about 600 p.s.i.g. Usually, the reaction pressure is dependent on conditions. In a batch process carried out in a sealed system, the pressure ordinarily will be the autogenous pressure developed under the temperature employed. In a continuous system, the pressure may be controlled as desired.

The process may be carried out as a batch process as described in the examples hereinafter given. It may also be carried out as a continuous process by feeding the reactants continuously to the reaction vessel and continuously removing the product, perfluoroethyl iodide, as more particularly described in the following paragraphs (a) and (b).

(a) 1,2-diiodotetrafluoroethane, sulfur tetrafluoride and hydrogen fluoride may be pumped or compressed separately into a stirred autoclave maintained at 200° C. and about 600 p.s.i.g.; the feed rates being maintained so that about 0.75 mole of $SF_4$ and about 8 moles of HF are fed into the system per mole of 1,2-diiodotetrafluoroethane per unit time. The pressure within the autoclave may be maintained by an automatic release valve which releases material when the pressure exceeds 600 p.s.i.g. The released material, comprising perfluoroethyl iodide, HF and unreacted diiodide and $SF_4$, may be separated by fractional distillation. Perfluoroethyl iodide will be recovered while HF, $SF_4$ and the diiodide can be recycled.

(b) Tetrafluoroethylene, sulfur tetrafluoride and a solution of iodine in liquid hydrogen fluoride may be pumped or compressed into a stirred autoclave maintained at 200° C. and about 600 p.s.i.g.; the feed rates and concentrations being maintained so that about 0.75 mole of $SF_4$, about 0.5 mole of $I_2$ and about 8 moles of HF are fed into the system per mole of tetrafluoroethylene per unit time. The pressure within the autoclave may be maintained by an automatic release valve which releases material when the pressure exceeds 600 p.s.i.g. The released material, comprising perfluoroethyl iodide, HF, a small amount of 1,2-diiodotetrafluoroethane, and unreacted $SF_4$ and $I_2$, may be separated by fractional distillation. Perfluoroethyl iodide will be recovered while HF, $I_2$, unreacted $SF_4$, and 1,2-diiodotetrafluoroethane will be recycled.

In order to more clearly illustrate this invention, preferred modes of carrying it into effect and the advantageous results to be obtained thereby, the following examples are given in which the amounts and proportions are by weight except where specifically indicated otherwise.

*Example 1*

A mixture of 129 parts of 1,2 - diiodotetrafluoroethane, 29.6 parts of sulfur tetrafluoride (mole ratio $SF_4/C_2F_4I_2=0.75$) and 109.6 parts of hydrogen fluoride (mole ratio $HF/C_2F_4I_2=15$ and weight ratio $HF/SF_4=270\%$) was heated in a Hastelloy pressure vessel at 200° C. for 16 hours under autogeneous pressure (about 500 p.s.i.g.). The vessel was then cooled to ambient temperature and vented through a scrubber containing aqueous potassium hydroxide to remove HF and $SF_4$. The off-gas was condensed in a solid carbon dioxide cooled trap and transferred to a steel cylinder. The product (68 parts) was shown to be 99.8% pure perfluoroethyl iodide by mass spectrometer analysis. The yield of perfluoroethyl iodide was 76% based on the original quantity of 1,2-diiodotetrafluoroethane. A small amount of the starting diiodide can be recovered.

*Example 2*

A mixture of 96.6 parts of iodine, 31 parts of sulfur tetrafluoride, 114.8 parts of hydrogen fluoride and 40 parts of tetrafluoroethylene (mole ratio $I_2/C_2F_4=0.95$, mole ratio $SF_4/C_2F_4=0.69$, mole ratio $HF/C_2F_4=14.4$ and weight ratio $HF/SF_4=270\%$) was heated in a Hastelloy pressure vessel at 200° C. for 10 hours under autogenous pressure (about 500 p.s.i.g.). The vessel was then cooled to ambient temperature and vented through a scrubber containing aqueous KOH to remove HF and $SF_4$. The off-gas was condensed in a solid carbon dioxide cooled trap and transferred to a steel cylinder. The product (84 parts) was 79% perfluoroethyl iodide. The yield was 71% based on the original tetrafluoroethylene. Unreacted starting materials may be recovered.

*Example 3*

Using the same procedure as Example 1, a mixture comprising 177 parts of 1,2-diiodotetrafluoroethane, 27.2 parts of sulfur tetrafluoride and 40 parts of hydrogen fluoride (mole ratio $SF_4/C_2F_4I_2=0.5$, mole ratio $HF/C_2F_4I_2=4$, weight ratio $HF/SF_4=147\%$) was heated under autogenous pressure (about 500 p.s.i.g.) for 12 hours at 200° C. The yield of perfluoroethyl iodide, recovered in the same manner as in Example 1, was 50%. If the reaction mixture is heated for 16 hours at 200° C., the yield is 63%.

*Example 4*

When Example 1 was repeated using 10 moles and 20 moles of HF per mole of 1,2-diiodotetrafluoroethane, essentially the same yield was obtained.

The following Examples 5 to 7 are included for purposes of comparison, and do not constitute embodiments of this invention.

*Example 5*

Using the same procedure as Example 1, a mixture comprising 177 parts of 1,2-diiodotetrafluoroethane, 27.2 parts of sulfur tetrafluoride and 10 parts of hydrogen fluoride (mole ratio $SF_4/C_2F_4I_2=0.5$, mole ratio $$HF/C_2F_4I_2=1$$

weight ratio $HF/SF_4=36.8\%$) was heated at 200° C. under autogenous pressure (490–540 p.s.i.g.) for 10 hours. The yield of perfluoroethyl iodide, recovered in the same manner as in Example 1, was 1%.

*Example 6*

When Example 1 was repeated omitting hydrogen fluoride from the reaction mixture, no perfluoroethyl iodide was obtained.

*Example 7*

When Example 6 was repeated, using a reaction temperature of 250° C., rather than 200° C., for 16 hours, yields of 6.9% of perfluoroethyl iodide, along with 9.1% of perfluorocyclobutane, 2% of hexafluoropropylene, 4.7% of tetrafluoroethylene, and smaller amounts of unidentified by-products, were obtained. These by-products were not observed in Example 1.

In Examples 1–7, the yields of perfluoroethyl iodide given are based on the moles of perfluoroethyl iodide obtained per mole of 1,2-diiodotetrafluoroethane or, in Example 2, tetrafluoroethylene originally used. In all of the examples, except Example 7, only traces of by-products were formed. Thus, in the absence of HF, the process gives either no desired product (Example 6) or large amounts of by-products (Example 7). Even using 30% HF based on $SF_4$, over three times the amount of HF considered necessary by Smith in U.S. Patent 2,937,-171 (Example 5), gave only a 1% yield. Thus, it seems apparent that the teachings of Smith do not apply to the present reaction.

It will be understood that the preceding examples have been given for illustrative purposes solely and that this invention is not restricted to the specific embodiments described therein. On the other hand, it will be readily apparent to those skilled in the art that, subject to the limitations set forth in the general description, many modifications can be made in the proportions of materials, conditions, and techniques employed without departing from the spirit or scope of this invention.

From the preceding description, it will be apparent that this invention provides a new and improved single-step process for preparing perfluoroethyl iodide in high yields from readily available starting materials. The process is easily carried out and is far less expensive than prior processes for making perfluoroethyl iodide. Accordingly, it is apparent that this invention constitutes a valuable advance in and contribution to the art.

The embodiments of the invention in which an exclusive property or privilege is claimed are defined as follows:

1. The process for preparing perfluoroethyl iodide which comprises heating under substantially anhydrous conditions a mixture of one mole of a member of the group consisting of 1,2-diiodotetrafluoroethane and tetrafluoroethylene mixed with from about 0.5 to about 1 mole of iodine, at least about 0.5 mole of sulfur tetrafluoride, and at least about 4 moles of hydrogen fluoride at a temperature of from about 175° C. to about 225° C. under a pressure of between 300 p.s.i.g. and 1500 p.s.i.g., and recovering perfluoroethyl iodide from the reaction mixture.

2. The process for preparing perfluoroethyl iodide which comprises heating under substantially anhydrous conditions a mixture of one mole of 1,2-diiodotetrafluoroethane, at least about 0.5 mole of sulfur tetrafluoride, and at least about 4 moles of hydrogen fluoride at a temperature of from about 175° C. to about 225° C. under a pressure of between 300 p.s.i.g. and 1500 p.s.i.g., and recovering perfluoroethyl iodide from the reaction mixture.

3. The process for preparing perfluoroethyl iodide which comprises heating under substantially anhydrous conditions a mixture of one mole of 1,2-diiodotetrafluoroethane, from about 0.5 to about 2 moles of sulfur tetrafluoride, and from about 4 to about 20 moles of hydrogen fluoride at a temperature of from about 175° C. to about 225° C. under a pressure of from about 400 p.s.i.g. to about 600 p.s.i.g., and recovering perfluoroethyl iodide from the reaction mixture.

4. The process for preparing perfluoroethyl iodide which comprises heating under substantially anhydrous conditions a mixture of one mole of tetrafluoroethylene mixed with from about 0.5 to about 1 mole of iodine, at least about 0.5 mole of sulfur tetrafluoride, and at least about 4 moles of hydrogen fluoride at a temperature of from about 175° C. to about 225° C. under a pressure of between 300 p.s.i.g. and 1500 p.s.i.g., and recovering perfluoroethyl iodide from the reaction mixture.

5. The process for preparing perfluoroethyl iodide which comprises heating under substantially anhydrous conditions a mixture of one mole of tetrafluoroethylene mixed with from about 0.5 to about 1 mole of iodine, from about 0.5 to about 2 moles of sulfur tetrafluoride, and from about 4 to about 20 moles of hydrogen fluoride at a temperature of from about 175° C. to about 225° C. under a pressure of from about 400 p.s.i.g. to about 600 p.s.i.g., and recovering perfluoroethyl iodide from the reaction mixture.

No references cited.